United States Patent [19]
Peterson et al.

[11] Patent Number: 6,072,788
[45] Date of Patent: Jun. 6, 2000

[54] FORWARD LINK TDMA POWER CONTROL SYSTEM AND METHOD

[75] Inventors: Curt Peterson, Mercer Islaind; Mark Virtue, Kirkland, both of Wash.

[73] Assignee: Metawave Communications Corporation, Redmond, Wash.

[21] Appl. No.: 08/826,721

[22] Filed: Apr. 7, 1997

[51] Int. Cl.[7] .................................................. H04B 7/212
[52] U.S. Cl. .......................... 370/337; 370/330; 370/334; 455/522; 455/562
[58] Field of Search ...................................... 370/330, 337, 370/347, 334; 455/562, 561, 522, 69, 126; 342/354, 457, 373

[56] References Cited

U.S. PATENT DOCUMENTS

| | | | |
|---|---|---|---|
| 5,426,641 | 6/1995 | Afrashteh et al. | 370/347 |
| 5,507,017 | 4/1996 | Whitmarsh et al. | 455/126 |
| 5,528,585 | 6/1996 | Cooley et al. | 370/347 |
| 5,576,717 | 11/1996 | Searle et al. | 342/373 |
| 5,579,306 | 11/1996 | Dent | 370/330 |
| 5,596,333 | 1/1997 | Bruckert | 342/457 |
| 5,842,114 | 11/1998 | Ozluturk | 455/69 |
| 5,889,494 | 3/1999 | Reudink | 342/373 |
| 5,914,947 | 6/1999 | Saito | 370/337 |

*Primary Examiner*—Hassan Kizou
*Assistant Examiner*—John Pezzlo
*Attorney, Agent, or Firm*—Fulbright & Jaworski L.L.P.

[57] ABSTRACT

A system and method are disclosed for independently adjusting the forward channel power level of each time division burst period of a frame of a time divided signal. The disclosed invention teaches the splitting of the time divided signal for provision to independently controllable circuits associated with each burst period of the frame. Each independently controllable circuit includes a controllable attenuator/amplifier and switching device. The attenuator/amplifier is operated to adjust the power level of its associated burst period to a predetermined magnitude. Thereafter, the switching device operates to direct each power adjusted burst period to be transmitted within a predetermined beam of a multi-beam antenna array.

56 Claims, 3 Drawing Sheets

FORWARD LINK TDMA POWER CONTROL SYSTEM AND METHOD

REFERENCE TO RELATED APPLICATIONS

Reference is made to the following and commonly assigned U.S. patent applications: APPARATUS, SYSTEMS AND METHODS FOR MULTIPLE ANTENNA TRANSMISSION IN WIRELESS COMMUNICATIONS SYSTEMS, Ser. No. 08/520,316, now U.S. Pat. No. 5,648,968; SYSTEM AND METHOD FOR CELLULAR BEAM SPECTRUM MANAGEMENT, Ser. No. 08/651,981, now U.S. Pat. No. 5,745,841.

TECHNICAL FIELD OF THE INVENTION

This invention relates to cellular antenna design. More specifically, this invention relates to a system and method for independently adjusting forward link power in individual TDMA burst periods.

BACKGROUND OF THE INVENTION

A primary factor affecting channel re-use in a cellular, or other radio communication system is the carrier to interference (C/I) ratio or more specifically the energy per bit to total spectral noise ratio ($E_b/N_0$) in a digital system such as TDMA. In providing more channels in any given structure, such as a cell site, you necessarily decrease the C/I ratio. One contributing factor to the C/I ratio is the amount of energy radiated by a cell site. Therefore, if you can control the amount of energy that is radiated by the cell site, you can have a net-positive impact on the C/I ratio.

It shall be understood that increasing the C/I ratio, is desirable as it indicates a larger signal strength on your carrier signal, which is the phone call or other communication that is being served by a particular cell site, and a smaller signal of interferer, such as a foreign user with respect to a particular cell site. Therefore, it is desirable for the energy density of the signal that is being served by a particular cell site to be as great as possible with respect to the mobile units being served by a particular cell.

In the past, attempts to improve the C/I ratio at any given structure have included adjusting the output power of the cell footprint so that there is minimal overlap between adjacent cells. However, this method is limited in its ability to reduce interference because, without the ability to dynamically alter power levels, elimination of the overlap entirely is not possible if a sufficient signal is to be available at the cell's fringe.

Likewise, where there is an obstruction between a communication device and the central structure, such as a cellular base transceiver station (BTS), provision of a sufficient signal to this communication device may involve a signal, in areas not affected by the obstruction, sufficient to have an undesirable overlap of adjacent cells. Therefore, a fixed power level, adjusted to provide adequate service in the shadow of an obstruction, may very well lead to a decreased C/I ratio at adjacent cells.

This problem is compounded by the fact that even when having adjustable power to maintain a minimum overlap, simply adding more channels to a particular cell site to accommodate more users at that cell site, increases the energy density. Therefore, the interference level at adjacent cells, is increased proportionately to the number of added channels because more communication devices at an adjacent cell are transmitting at a fixed power level sufficiently high to overlap the service area.

Therefore, there is a need in the art to minimize the forward transmitted power level by adjacent cells to provide a signal sufficient to sustain communication throughout a predefined area, while avoiding any overlap of an adjacent predefined area when possible. As a signal sufficient to sustain communication at the boundary of two adjacent predefined areas or outboard of an obstruction is likely to also be of a sufficient strength to overlap this boundary, it is desirable to be able to dynamically adjust the power level so as not to overlap the boundary when no communication device is operating at or near the boundary.

As communication systems often use time division multiple access signals, there is also a need in the art to provide a time division signal with independent power level adjustment of the various time divisions of the signal to avoid overlap in each time division where no communication device is operating at or near the boundary or outboard of an obstruction.

There is further need in the art for a system to dynamically provide a power adjusted signal to individual directional antenna elements of a plurality of antenna elements to reduce signal overlap to only those areas where a communication device is operating.

SUMMARY OF THE INVENTION

These and other needs and advantages are realized by a system in which in the forward channel power level is modified for individual communication devices receiving the signal. Modification, or adjustment of the power level is accomplished to achieve a power level sufficiently strong to sustain clear communication while being sufficiently low to minimize or avoid an overlap of an adjacent area or otherwise unnecessarily increase the energy density.

It shall be understood that forward channel power level, as referenced herein, is the power level of the transmitted signal from a base transceiver station (BTS) to a remote communication device, such as a mobile communication unit.

It shall be appreciated that, where time division multiple access (TDMA) channels are used, adjusting the forward link power level for a TDMA frame may still result in unnecessary overlap of an adjacent area. Because TDMA may be utilized to provide communication for a plurality of communication devices, each in a different burst period of a TDMA frame, a high power level may be needed at one burst period while such a level is not necessary for other burst periods. Therefore, if the power level of a frame is adjusted to have a sufficient power level for the one communication device requiring such a level, unnecessary overlap may result in the remaining burst periods of the frame.

Adjustment of the power level of a complete frame of bursts to result in a sufficient high level to service the most remote communication device is typically necessary because in order for mobiles to remain synchronized with the BTS, it is important that the synchronizing channel be present to the communication devices at all times. Otherwise, service would be interrupted.

The present invention uses the benefits provided by a multi-beam system, wherein each user may be placed on an individual beam, to transmit out that individual beam a signal at a power level determined to be sufficient for communication with a particular communication device. In order to provide the proper synchronizing signal to all devices, the power level to every user within a beam may be the same. Therefore, the present invention offers the maximum benefit in a TDMA system where each user in fact operates on a separate beam. It shall be appreciated that in order to achieve the maximum benefit of the present invention in a TDMA system, some form of narrow beam system, to allow targeting users individually, is utilized. One such narrow beam system is shown in U.S. Pat. No. 5,563,610, entitled "NARROW BEAM ANTENNA SYSTEMS WITH ANGULAR DIVERSITY", incorporated herein by reference and its continuation-in-part application entitled "APPARATUS, SYSTEMS AND METHODS FOR MULTIPLE ANTENNA TRANSMISSION IN WIRELESS COMMUNICATIONS SYSTEMS" previously incorporated by reference.

The effectiveness of the present invention when used in a TDMA system depends in part on the distribution of the various users throughout the multiple beams. Experimentation has revealed that users are generally uniformly distributed over a given angular sector in any cell. Therefore, probability is relatively high, depending on how many narrow beams are used, that users are in fact going to be in their own unique beam. Certainly, the smaller the beam angle then the higher the probability is that users will be distributed properly to achieve maximum control.

Accordingly, one technical advantage of our invention is to further increase the carrier to interference ratio with respect to adjacent cell sites through utilization of narrow beams. In addition to providing the increased C/I ratio due to dynamic adjustment of the power level, the narrow beams provide an increased likelihood of a single communication device being located in a particular beam. As discussed above, this allows for a lower power adjustment within more burst periods of a frame. Furthermore, the C/I ratio will be further increased by the fact that the narrow beam results in a far smaller radiated pattern overlapping an adjacent cell site. Likewise, the energy density within the transmitting cell is reduced by the use of narrow beams, as well as through the use of reduced power levels.

An additional advantage of the present invention is provision of extended battery life to users because they will be on a single narrow beam. The increased antenna gain of a narrow beam system will allow the system to turn down the transmit power at the mobile end while experiencing the same signal quality. This reduction in transit power will impact battery life of the mobile unit. Likewise, the BTS can also turn down the transmit power further impacting the aforementioned C/I ratio and energy density advantages.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

The present invention provides a system and method by which forward channel TDMA power level may be adjusted for each individual receiver communicating through a TDMA channel during a TDMA frame. Moreover, power level adjustment of the TDMA channel according to the present invention may be made at any or all TDMA bursts forming the TDMA frame.

To enable a better understanding of the advantages of the present invention, a brief description of some relevant prior art is included hereinafter.

A common scheme for providing multiple access to a single resource in digital systems is to use a series of discrete time slots, called burst periods. Blocks containing a predetermined number of these burst periods are identified as a frame. A string of these burst periods, comprising a frame or a plurality of frames, may be arranged sequentially and contiguously such that each identified user of the system may have a predetermined fixed period of time to utilize the system.

Typically in digital wireless communication, an envelope of radio frequency (RF) energy is transmitted for a fixed period of time; this period of time being the aforementioned burst period. Different users of the system may be assigned different burst periods of a frame and, thereby, conduct independent, seemingly simultaneous, communication over a single channel.

Although, the use of TDMA provides an often acceptable means by which to increase communication capacity without increasing the number of individual RF channels used, the use of TDMA in wireless communication is not without trade-offs. Unlike a Frequency Division Multiple Access (FDMA), usually analog, cellular system, where a single user is present on a given channel at a particular time, the user of the digital cellular system experiences a potential for the presence of an interfering signal from an adjacent cell in proportion to the number of burst periods defined in a frame.

For example, in digital cellular systems, typically two adjacent cell sites do not operate synchronously. Therefore, a user on a particular frequency in time slot one of a first cell, for example, could potentially have interference by users in an adjacent cell not only operating in time slot one but also those operating in time slots two, three, etcetera. This is because of the fact that the time slots are generally not guaranteed to be aligned on adjacent cells. So in a digital system the potential number of interferers is a factor of N greater than it is an analog system; N being the number of time slots, or burst periods, there are in a frame.

Currently there are digital cellular systems that have TDMA frames defined to include various numbers of burst periods. However, three, six, and eight time slots per frame are the most common. Therefore, as discussed above, you have three, six or eight times the potential number of interferers. As such, interference reduction becomes paramount in digital systems.

Figure 3:
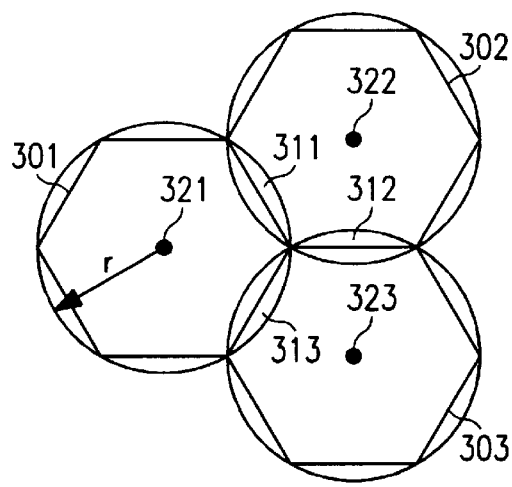
FIG. 3 illustrates a typical prior art cellular pattern wherein overlap is present at adjoining cell borders.

Directing attention to FIG. 3, a typical prior art cellular pattern is illustrated by communications arrays 321 through 323 disposed to communicate in predefined areas, or "cells," illustrated as cells 301 through 303. As shown, a cell footprint is actually fixed by its forward channel radiated power, illustrated here as radius r. As can be seen by areas 311 through 313, there is some overlap between the radiation patterns of arrays 321 through 323 in order to provide proper communication coverage within the cells. These overlapped areas of communication coverage cause the potential for interference, such as by decreased C/I ratios as well as co-channel interference where the same channels are used by cells with overlapping cell footprints. Therefore, it is preferable to limit the forward channel radiated power to reduce this overlap area, while maintaining sufficient forward channel radiated power to cover the area encompassed by the particular cell.

However, because of terrain differences between the cells, such as buildings that exist in one cell boundary and not in another cell boundary, an optimal radiated footprint is not always possible. What often occurs is that a network provider will increase the power of their forward link so that they can achieve a tolerable trade off between minimizing radiation pattern overlap and sufficient coverage of the particular cell. Therefore, typically if you have obstructions within your cell boundary, the transmit power may be optimal in some areas of the cell and much too great in other areas, thus overlapping cell boundaries significantly. That obviously causes increased potential for interference between the cells.

In addressing this problem, the present invention utilizes a number of narrow angular beams to sub-divide the 360° cellular pattern coverage area. However, according to the present invention, each of these narrow beams can be independently controlled so that their transmit power can be independently adjusted. A system and method for providing multiple narrow angular beams within individual cells of a cellular overlay communication system is disclosed in U.S. Pat. No. 5,563,610, entitled "NARROW BEAM ANTENNA SYSTEMS WITH ANGULAR DIVERSITY", as well as in continuation-in-part application entitled "APPARATUS, SYSTEMS AND METHODS FOR MULTIPLE ANTENNA TRANSMISSION IN WIRELESS COMMUNICATIONS SYSTEMS", incorporated herein by reference.

Figure 1:
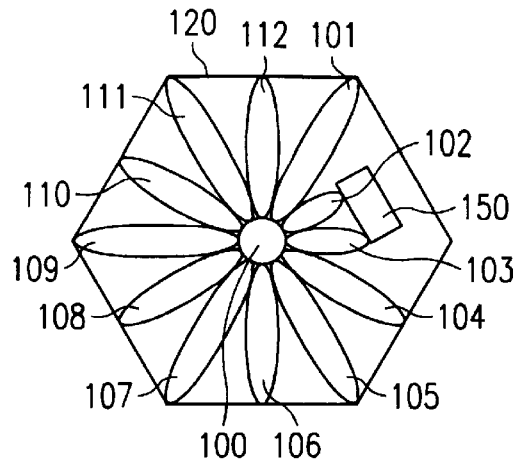
FIG. 1 illustrates a multi-beam communication system utilized by the present invention.

Directing attention to FIG. 1, beams 101 through 112 are shown sourced by communication array 100 within cell 120. As is common in an urban setting, beams 102 and 103 intersect building 150. In order for communication array 100 to communicate with a device located within or beyond building 150, beam 102 or 103 must necessarily be increased in power to overcome the fact that they are being disturbed by building 150. Whereas, the other beams have no obstructions, so their power may be maintained at a lower level while still providing sufficient coverage within cell 120.

It shall be appreciated, if you have a cell site providing a 360° beam, that increasing the power to compensate for an anomaly within the cell, such as a concrete and steel structure, would result in increased power throughout the 360° beam. This, in turn, would cause the cellular footprint in areas unaffected by the anomaly to increase the overlap of adjacent cells. Thus the potential for interference in and by adjacent cells is increased when adjusting a communication array's power to compensate for cell anomalies.

One of the advantages in the independent variation of power of the various beams of the present invention is that communication may be adjusted for non-homogenous conditions in a particular cell, such as the aforementioned concrete and steel structures located within the cell, without increasing the potential for interference in adjacent cells. Only the power of those beams disturbed by the anomaly need be increased to compensate for its effects.

Use of time division multiple access (TDMA) adds a layer of complexity to the adjustment of antenna beam power levels. Through the use of TDMA, multiple discrete messages may be communicated through a single RF carrier frequency. For example, where a carrier frequency is time divided into a frame consisting of 3 contiguous bursts of signal, a discrete message, or portion thereof, may be included in each of the 3 bursts. Equating each of the three bursts with a different communication source or recipient provides a convenient method by which to provide multiple, seemingly simultaneous, user access to a single carrier.

However, prior art TDMA implementations typically require the BTS to transmit all time bursts in a frame at the same power level so that any communication device within the cell's radiation pattern may receive this signal at a level sufficient for processing. For example, a device operating within range of beam 102 of FIG. 1, but outboard of building 150 from communication array 100, would require a higher power level at beam 102 than a device operating within the same beam inboard of building 150. If these two devices were operating on the same carrier frequency, but during different time bursts, a typical TDMA implementation would require the increased power level, increased to adequately service the outboard device, for the inboard device. Increasing the power of a transmission of this carrier frequency necessarily contributes to interference problems on this and other carrier frequencies throughout the communication system. Therefore, the increased power for burst periods where such power increase is not required unnecessarily contributes to interference problems.

Moreover, through the use of TDMA, it is likely that communication sources sharing a single carrier frequency through the use of TDMA will be located within different beams of the communication array. For example a communication device may be operating within range of beam 102, but outboard of building 150 from communication array 100, while another device utilizing a different TDMA time burst of the same frequency is operating within range of beam 109. As can be seen in FIG. 1, beam 109 is unaffected by building 150. Therefore, according to the prior art, an increase in power for a full TDMA frame to compensate for building 150, as required by the device operating in beam 102, would result in beam 109 being extended beyond the boundaries of cell 120. Therefore, the increased power for burst periods, where such power increase is not required, unnecessarily contributes to undesired increases in overlap between adjacent cells and thus an increase in interference, such as decreased C/I ratios, co-channel interference, and near-far problems. As such the overall system capacity might be reduced by a lower reuse of channels in order to avoid overlap of channels at adjacent cells and the associated problems.

Figure 2:
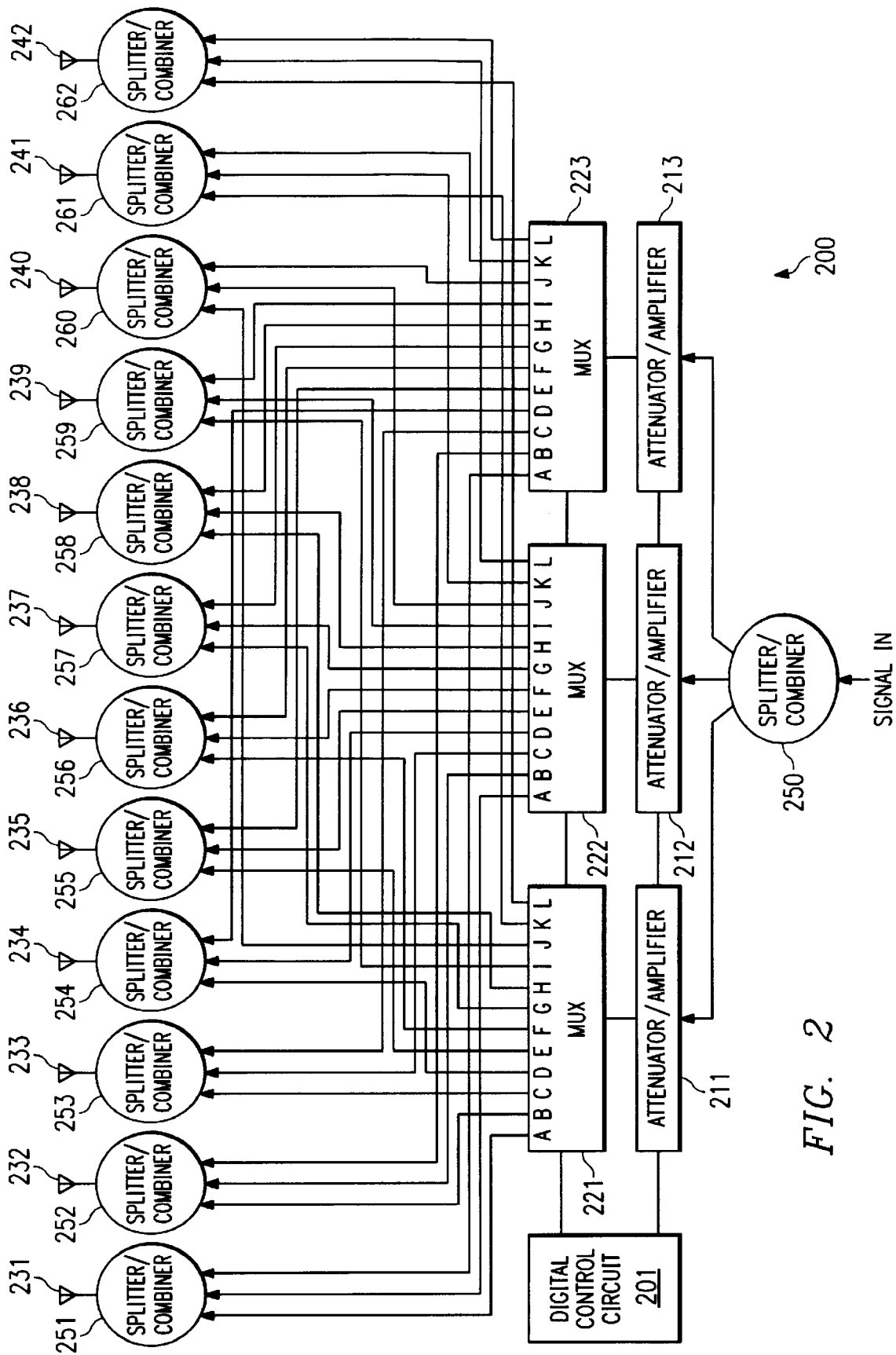
FIG. 2 illustrates a preferred embodiment of the present invention.

Directing attention to FIG. 2, there is illustrated system 200 for providing a TDMA signal with independent power control of each burst in a TDMA frame, to individual antenna elements of a communication array. As illustrated, a signal to be transmitted by the system is provided at splitter 250. The divided signal is then supplied to attenuator/amplifiers 211 thorough 213. Signal output of each attenuator/amplifier 211 through 213 is input into one of the multiplexers (MUX) 221 through 223. Each of attenuator/ amplifier 211 through 213 and MUXes 221 through 223 is coupled to, and controlled by, digital control circuit (DCC) 201.

Each antenna unit 231 through 242 is provided with a combined signal of an output of each MUX through associated signal combiner 251 through 262. These antenna units may be utilized to provide the individual radiation patterns illustrated as beams 101 through 112 in FIG. 1.

In order to provide independent power control of each TDMA burst period of a frame, the present invention provides circuitry to independently manipulate the signal during each TDMA burst. In the system illustrated by FIG. 2, the TDMA frame includes 3 burst periods. Therefore, splitter 250 divides the signal into 3 separate signal components to be provided to circuitry associated with each TDMA burst period.

It shall be appreciated that in a preferred embodiment, splitter 250 divides the power of an input signal N ways, where N is the number of burst periods per TDMA frame. This division of the signal results in each signal component output by splitter 250 having a power component 1/N of the original signal. Of course, a signal amplifier may be included in splitter 250 where a signal power 1/N of the original signal is undesirable. For example, where a TDMA frame including a large number of burst periods is used, the division of a single input signal may result in a power level of divided signal components having an unacceptable signal to noise ratio and, thus, signal amplification at the point of signal division may be advantageous.

Once split into a number of signal components equal to the number of TDMA burst periods, these components are provided to circuitry to independently manipulate the signal during each TDMA burst. Illustrated in FIG. 2 are attenuator/amplifier 211 and MUX 221, associated with a first TDMA burst period, attenuator/amplifier 212 and MUX 222, associated with a second TDMA burst period, and attenuator/amplifier 213 and MUX 223, associated with a third TDMA burst period. As discussed above, the number of attenuator/amplifiers and MUXes may be varied depending on the number of burst periods per TDMA frame desired.

Attenuator/amplifiers 211 through 213 provide independent signal power component manipulation providing means by which each TDMA burst period may be attenuated or amplified, hereinafter collectively referred to as adjusted, as desired, and independent of any other TDMA burst periods. In order to better understand how adjustment of each burst period is accomplished according to the present invention, it is helpful to understand the composition of the signal as it progresses through the circuitry. Therefore, the various stages of signal manipulation are discussed in reference to an example signal below.

Using as an example a single RF carrier having imposed thereon a 3 burst TDMA frame, the signal as initially provided to splitter 250 includes all three burst periods with a power component of 1. Having been divided three ways by splitter 250, our example signal is provided to each attenuator/amplifier 211 through 213 still including all three burst periods, however the power component of each of these 3 signals is now ⅓.

Each attenuator/amplifier 211 through 213 is coupled to DCC 201 which provides adjustment control the attenuator/amplifiers. It shall be appreciated that DCC 201 operates synchronously with the time divisions of the TDMA signal. Such synchronization may be provided by a separate clock operating in DCC 201 from which the timing of the TDMA frame may be determined, or DCC 201 may utilize an external signal (not shown) to determine the timing of the TDMA frame. Of course, DCC may itself include circuitry for combining the discrete signals into the TDMA frame supplied to splitter 250 and, thus, determine the timing of the TDMA frame. A system providing monitoring of communication parameters for systems utilizing a multiple beam system and associated beam control is disclosed in co-pending application entitled "SYSTEM AND METHOD FOR CELLULAR BEAM SPECTRUM MANAGEMENT", previously incorporated by reference. It shall be appreciated that attenuator adjustment and MUX control signals provided by DCC 201 may be provided in accordance with beam control determinations as are disclosed in the above referenced co-pending application.

For example, in addition to the ability to determine the timing of the burst periods contained in a signal, DCC may also be provided with information from which to determine a particular burst period associated with a communication device, as well as an antenna unit (or beam) associated with the BTS most advantageous for communicating with a communication device. Such information may be provided DCC 201 by a system (not shown) monitoring communication parameters of various devices in communication with the system as are well known in the art. Of course, circuitry for monitoring communication between the BTS and various communication devices may be included within DCC 201, if desired. Having information regarding the particular TDMA burst period and antenna unit (or beam) a communication device is operating within, DCC 201 may intelligently adjust a signal TDMA burst period and switch, or route, it to a proper antenna unit.

Therefore, by operating synchronously with the TDMA frame, DCC 201 is able to control adjusting attenuator/amplifiers 211 through 213 at the proper times to provide a desired power level of the signal during a particular burst period. It shall be appreciated that the desired power level may be determined by circuitry monitoring communication between a BTS associated with the various antenna units and a communication device. For example, circuitry may be provided that determines the distance from the BTS and the device or, similarly, that determines the signal to noise ratio of the received signal at the device, may be used to supply DCC 201 with information regarding a desired power level.

It shall be appreciated that, through burst period synchronous control of the attenuator/amplifier adjusting of the TDMA signal, it is possible for an independent attenuator/amplifier to be utilized to adjust the power level of each burst period. The use of an attenuator/amplifier for each burst period is advantageous in providing for routing of each burst to independent beams. Therefore, the preferred embodiment utilizes an attenuator/amplifier for each burst period. Moreover, although adjustment of the attenuator/amplifier is possible between bursts, the use of individual attenuator/amplifiers for each burst period also allows the burst periods not associated with a particular attenuator/amplifier to be used by that attenuator/amplifier to ramp adjustment of the signal to the desired power level, thus lessening the effects of ringing or other transient signal responses.

Again using the above discussed example RF carrier, a signal including all three burst periods having a power component of ⅓ is provided to each attenuator/amplifier 211 through 213. Under control of DCC 201, each attenuator/amplifier may be manipulated at the proper time to adjust the power of its associated input signal so as to output a signal having a desired power level component.

For example, attenuator/amplifier 212 may be adjusted to a predetermined setting during a first burst period in order to provide a desired steady state power level component output to the signal throughout a second burst period. Likewise, attenuator/amplifier 213 may be adjusted to a predetermined setting during a second burst period in order to provide a desired steady state power level component to the output signal throughout a third burst period. Where, for example, the communication device utilizing the second burst period is operating near the BTS utilizing the present invention, the desired power level may be, for example, a factor of 3 times greater than the signal provided attenuator/amplifier 212, resulting in a signal power level of 1 (3×⅓) output from this attenuator/amplifier. However, where the communication device utilizing the third burst period is operating with an obstruction between itself and the BTS utilizing the present invention, the desired power level may be a factor of 6 times greater than the signal provided attenuator/amplifier 213, resulting in a signal power level of 2 (6×⅓) output from this attenuator/amplifier.

In order to provide the desired square wave with respect to the power levels of the contiguous burst periods when utilizing the individual attenuator/amplifiers, the preferred embodiment utilizes MUXes 221 through 223 controlled by DCC 201 to provide switching between the variously adjusted signals in synchronization with the individual TDMA burst periods. Of course, any switching means capable of switching between various signals at the appropriate burst period may be utilized, if desired.

As it is anticipated that the present invention will be utilized in a communication array having a plurality of angularly diverse beams radiating from an antenna or plurality of antenna units coupled thereto, the MUXes have individual outputs associated with each beam. Therefore, the MUX under control of DCC 201 may direct an input signal to be radiated within any of the beams.

Once again using our example RF carrier, a signal including all three burst periods having a power component of 1 during a second burst period is provided to MUX 222. Likewise, a signal including all three burst periods having a power component of 2 during a third burst period is provided to MUX 223.

Figure 5:
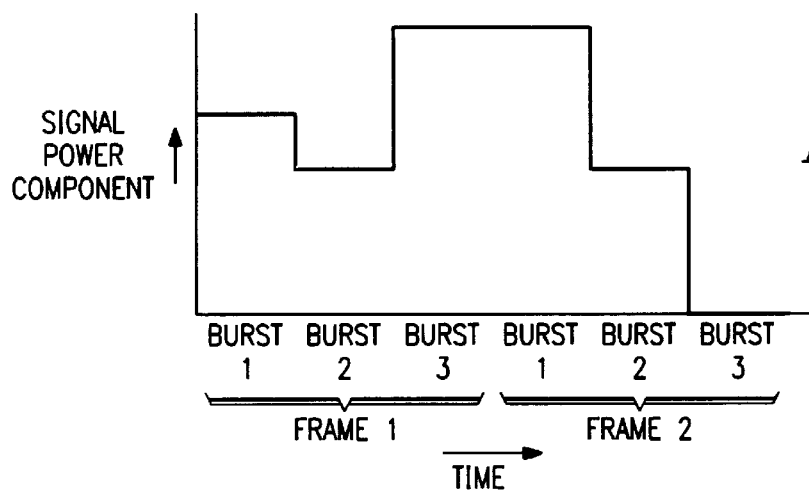
FIG. 5 illustrates dynamically altered signal power levels within TDMA frames.

Under control of DCC 201, each MUX may be switched to provide, at any of its outputs, a signal having a power level component only during a select burst period. For example, MUX 222 may be activated to provide a signal at the output labeled as "A" during the second burst period and no signal at any output during the first and third burst periods. Likewise, MUX 223 may be activated to provide a signal at the output labeled "A" during the third burst period and no signal at any output during the first and second burst periods. Such switching might result in variation of the signal power component over time such as is illustrated in FIG. 5 where the signal power level of the second burst of the first frame is significantly lower than that of the third burst of the first frame. Also, it should be appreciated that transition from the power level of contiguous bursts is well defined, providing a power level wave form approaching a square wave and thus, providing a signal at substantially the desired power level throughout the TDMA burst period.

It shall be understood that contiguous burst periods of the signal need not be provided by the individual MUXes of the present invention to the same antenna unit (or beam). For example, in the above case MUX 222 may be activated to provide the signal during the second burst period having a power component of "1" at the output labeled as "A" and MUX 223 may be activated to provide the signal during the third burst period having a power component of "2" at the output labeled "F." It shall be appreciated that such switching is advantageous where, for example output "A" is associated with beam 109 and output "F" is associated with beam 102 of FIG. 1. Here a communication device operating outboard of building 150 during the third TDMA burst period within beam 102 will be provided a signal of suitable power without the power of beam 109 being unnecessarily increased.

It shall be appreciated, although 3 discrete 12 to 1 MUXes have been illustrated, where 3 is the number of TDMA burst periods and 12 is the number of antenna units (or beams) to be utilized, that any combination of MUXes capable of discretely switching a signal associated with a particular burst period to a desired antenna unit may be utilized. For example, in a 3 burst period, 12 antenna unit, system, a single 12 to 3 MUX may be controlled to switch the 3 discrete signal components associated with the 3 burst periods to any one of the 12 antenna units.

After time division switching by the MUXes, the multiple signals, as attenuated or amplified for each burst period, output by each MUX are provided to a combiner associated with the particular antenna unit 231 through 242. For example, the output identified as "A" of each MUX 221 through 223 is combined by combiner 251 to result in a signal at antenna 431. Likewise, the output identified as "B" of each MUX 221 through 224 is combined by combiner 252 to result in a signal at antenna 232.

It shall be understood, although outputs of the various MUXes of a TDMA channel circuit are combined by a combiner, that switching of the various MUXes by DCC 201 results in an output only by a single MUX of the TDMA channel circuit actually being active. The single active output being the output associated with a desired antenna unit of the particular MUX associated with the proper TDMA burst period. Therefore, the combiners 251 through 262 provide a common path through which an active output of MUXes 221 through 223 are coupled to antenna units 231 through 242. Of course, output signals of the various MUXes may be summed by the combiners, if desired. For example, where an attenuator/amplifier is unable to amplify a signal to the magnitude required, the outputs of several MUXes may be combined to provide a greater signal power level component.

It shall be appreciated that provision of a predetermined signal time component at a particular MUX output enables the present invention to direct a single TDMA burst period, having been adjusted for a power level independent of any other TDMA burst periods in the frame, to a selected antenna unit (or beam). Where the antenna unit provided with the signal emits a narrowly focused radiation pattern, as discussed above, the present invention provides for each TDMA burst to be communicated in a narrowly defined area at a power level suitable for use by a particular communication device. This allows signals to be transmitted in a direction with a power level sufficiently high for utilization in a particular instance, and low enough to reduce co-channel interference, adjacent channel interference, as well as a reduction in near-far problems and the like.

It shall be appreciated, although a system utilizing 12 individual beams associated with 12 antenna units is shown, that the present invention is fully scalable and may include any number of antenna units. For example, a single omni-directional antenna unit may be utilized according to the present invention to provide a signal in a 360° beam the power of which is independently adjustable for each TDMA burst period transmitted. Similarly, the present invention is scalable to utilize any number of burst periods per frame.

Figure 4:
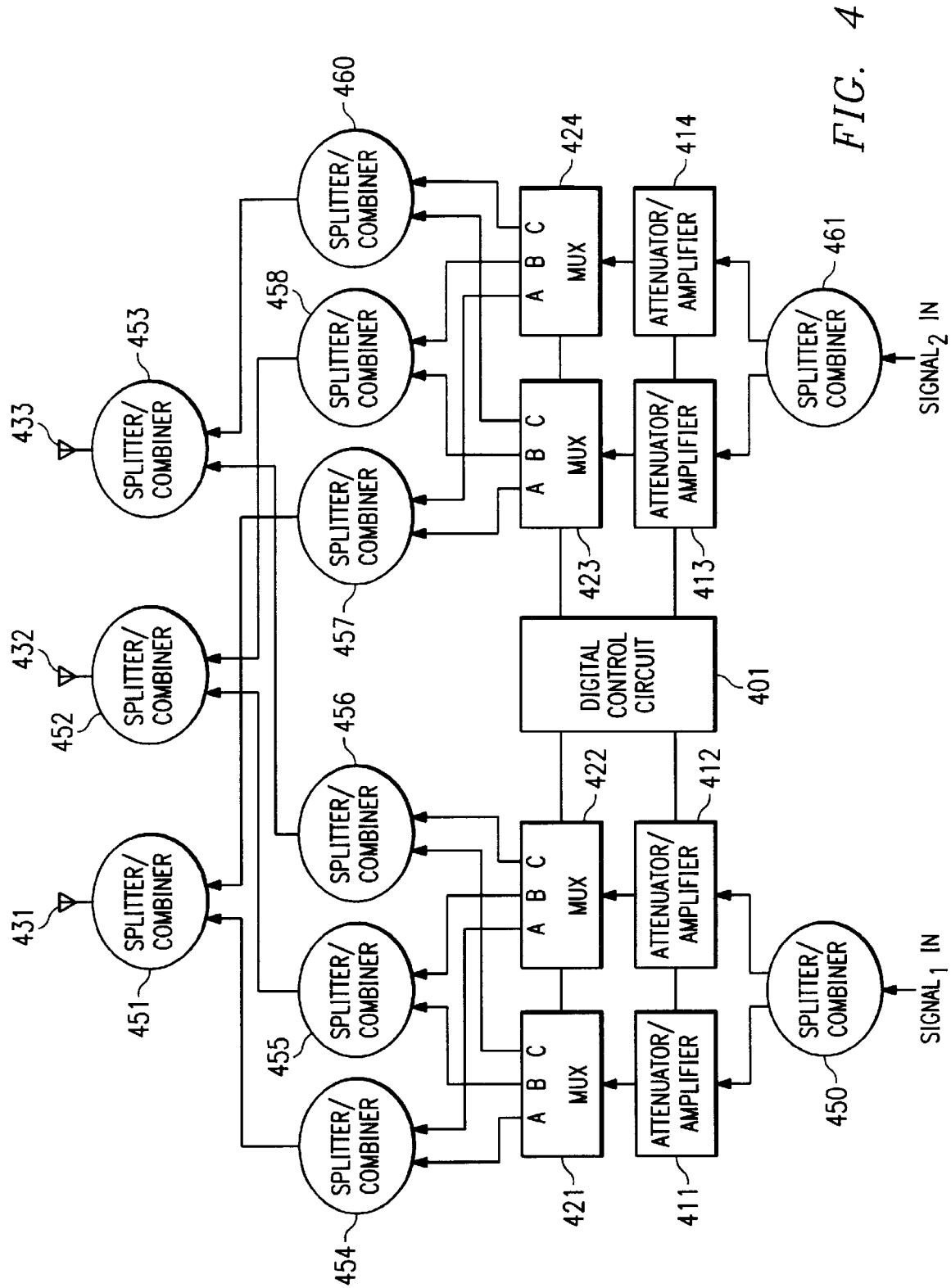
FIG. 4 illustrates an alternative preferred embodiment of the present invention wherein scaling is used to achieve increased capacity.

Likewise, the present invention is scalable to include the use of multiple TDMA signals. Directing attention to FIG. 4, an implementation scaled to include two separate signals, each time divided to include two burst periods, is shown. It shall be appreciated that each signal has associated therewith circuitry, hereinafter referred to as a TDMA channel circuit, substantially as described above with respect to the single TDMA implementation. Specifically, a first signal to be transmitted by the system is provided at splitter 450. The divided signal is then supplied to attenuator/amplifiers 411 and 412. Signal output of both attenuator/amplifiers 411 and 412 are input into one of MUXes 421 and 422. Each output of MUXes 421 and 422 is associated with an antenna unit 431 through 433 and is input into a particular first stage combiner 454 through 456 also associated with a particular antenna unit.

Likewise, a second signal to be transmitted by the system is provided at splitter 461. The divided signal is then supplied to attenuator/amplifiers 413 and 414. Signal output of both attenuator/amplifiers 413 and 414 are input into one of MUXes 423 and 424. Each output of MUXes 423 and 424 is associated with a particular antenna unit 431 through 433 and is input into a first stage combiner 457 through 460 also associated with that particular antenna unit.

Thereafter, the two signals, as attenuated or amplified for each burst period, output by each first stage combiner 454 through 460 are provided to a second stage combiner associated with the particular antenna unit 431 through 433 to which the first stage combiner 454 through 460 is associated. For example, the output identified as "A" of each MUX 421 through 424 is combined by first stage combiners 454 and 457, which output is combined by second stage combiner 451 to result in a signal at antenna 431. Likewise, the output identified as "B" of each MUX 421 through 424 is combined by first stage combiners 455 and 458, which output is combined by second stage combiner 452 to result in a signal at antenna 432.

It shall be understood, although outputs of the various MUXes of a TDMA channel circuit are combined by a first stage combiner, that switching of the various MUXes by DCC 401 results in only an output by a single MUX of the TDMA channel circuit actually being active. The single active output being the output associated with a desired antenna unit of the particular MUX associated with the proper TDMA burst period. Therefore, the first stage combiners 454 through 460 provide a common path through which an active output of MUXes 421 and 422 or MUXes 423 and 424 are coupled to antenna units 431 through 433.

However, as each TDMA channel circuit is providing a discrete signal for each TDMA burst period, such as, for example, imposed upon a different RF carrier frequency, second stage combiners 451 through 453 may in fact combine discrete simultaneous signals provided by each of the TDMA channel circuits to be provided to a single antenna unit (or beam) associated therewith. For example, two communication devices may be within range of antenna unit 431; the first device operating on a carrier frequency associated with signal$_1$ and the second device operating on a carrier frequency associated with signal$_2$. If each of these devices is operating in the first TDMA burst period of a frame, the signal associated with the first device might be switched by DCC 401 through output "A" (associated with antenna unit 431) of MUX 421 (associated with the first burst period of the frame) in the TDMA channel circuit controlling signal$_1$. Likewise, the signal associated with the second device might be switched by DCC 401 through output "A" (associated with antenna unit 431) of MUX 423 (associated with the first burst period of the frame) in the TDMA channel circuit controlling signal$_2$.

Although both of attenuator/amplifiers 411 through 412 and MUXes 421 and 422 are illustrated coupled to DCC 401, more than one DCC may be utilized. For example, an individual DCC for each TDMA channel circuit may be utilized if desired. Of course, each of these individual DCCs may be interconnected to provide synchronisity of TDMA burst periods, if desired. However, there is no limitation to the present invention that each TDMA channel circuit operate to provide synchronous TDMA burst periods with companion TDMA channel circuits.

Furthermore, there is no limitation that each TDMA channel circuit of the present invention provide a signal which includes the same number of time division bursts per frame as its companion TDMA channel circuits. For example, an additional attenuator/amplifier and MUX combination (not shown) could be added to those shown associated with signal$_2$ illustrated in FIG. 4, if desired. This would provide for independent power control of a 2 burst period TDMA frame with respect to signal$_1$ while providing for independent power control of a 3 burst period TDMA frame with respect to signal$_2$.

Moreover, it shall be appreciated that, like the single TDMA embodiment discussed above, the multiple TDMA signal embodiment of the present invention may utilize any number of TDMA burst periods in combination with any number of beams. Likewise, the multiple TDMA embodiment is not limited to the two TDMA signals illustrated. The present invention is fully scalable to provide control of any number of TDMA signals.

It shall be appreciated that, although the present invention has been described with reference to forward channel communication, there is no limitation to the present invention operating in the forward channel. By reversing signal flow, as well as the function of the various splitter/combiners of the present invention, reverse channel attenuation/amplification of individual TDMA bursts may be realized.

Furthermore, although a system utilizing a plurality of discrete antenna units providing narrow beam radiation patterns has been discussed, it shall be appreciated that a single antenna providing multiple beams may be used according to the present invention. Likewise, any antenna structure providing at least one beam may be utilized by the present invention.

Although the present invention and its advantages have been described in detail, it should be understood that various changes, substitutions and alterations can be made herein without departing from the spirit and scope of the invention as defined by the appended claims.

What is claimed is:

1. A system for providing a signal within each time division of a predefined frame of signal time divisions of a same frequency with independent power level adjustment, said system comprising:

means operable for each said time division for adjusting the power level of an input signal associated with each said time division to a predetermined magnitude maintained during said associated time division; and means for selectively switching between each of said power level adjusted signals operable to provide said frame of signal time divisions of said same frequency including said input signal within each said associated time division having said predetermined magnitude.

2. The system of claim 1, wherein said adjusting means comprises:

an independently adjustable attenuator/amplifier for each said input signal associated with each said time division.

3. The system of claim 2, wherein each said attenuator/amplifier is adjusted during a time division other than said associated time division to provide substantially steady state attenuation/amplification of a signal during said associated time division.

4. The system of claim 1, wherein said switching means comprises:
an independently switchable switching device for each signal time division.

5. The system of claim 4, wherein at least one of said switching devices comprises a multiplexer.

6. The system of claim 1, further comprising an antenna array adapted to provide a plurality of radiation beams, said antenna array including circuitry adapted to provide directional communication through ones of said plurality of radiation beams.

7. The system of claim 6, wherein said switching means operates to provide a particular time division of said time division signal to a portion of said circuitry associated with a predetermined beam of said plurality of radiation beams.

8. The system of claim 7, wherein said circuitry comprises a plurality of signal combiner means for combining a plurality of input signal paths into at least one output signal path, wherein at least one signal combiner means of said plurality of signal combiner means is associated with a particular radiation beam of said plurality of radiation beams.

9. The system of claim 6, wherein said antenna array comprises an antenna unit for each radiation beam of said plurality of radiation beams.

10. The system of claim 1, further comprising:
signal splitting means operable to split an input time division signal into a predetermined number of discrete substantially identical time division signals, wherein said splitting means provides said input signals associated with each said time division.

11. The system of claim 10, wherein said predetermined number of discrete time division signals is equal to a number of time divisions associated with said predefined frame of signal time divisions.

12. The system of claim 1, wherein both said power level adjusting means and said switching means are operable under control of a control circuit substantially synchronous with said time divisions.

13. The system of claim 12, wherein said control circuit is operable to control a plurality of associated sets of said power level adjusting means and said switching means, said sets providing independent power level adjustment of a plurality of frames of signal time divisions.

14. A system having a time division input where discrete signals can occur during ones of said time divisions, wherein a predetermined number of time divisions defines a frame, said system comprising:
means for splitting said input signal into a number of different substantially identical signals, wherein said number of signals is at least as great as the number of time divisions in said frame;
means for adjusting the power level of each said split signal to result in a desired amplitude during a particular one of said time divisions; and
means for selectively outputting the power level adjusted split signals to result in substantially only said particular time divisions having said desired amplitude being output.

15. The system of claim 14, wherein said selective outputting means comprises:
a switching medium which samples the output of each adjusting means during said particular time division associated with said adjusting means.

16. The system of claim 15, wherein said switching medium comprises:
at least one switch matrix associated with each said time division, each said switch matrix providing a plurality of output signal paths wherein ones of said signal paths are associated with different antenna beams of a plurality of antenna beams.

17. The system of claim 16, further comprising:
at least one signal combiner associated with said ones of antenna beams of said plurality of antenna beams, wherein said signal combiners are operable to combine signal paths from ones of said switch matrixes to a single output associated with a particular antenna beam of said plurality of antenna beams.

18. The system of claim 14, wherein said power level adjusting means and said selective outputting means are operated under the control of a control processor, said control of said adjusting means and said selective outputting means being substantially synchronous with said time divisions.

19. A system having a plurality of antenna beams for receiving signals associated with time divisions of a time division signal, wherein a predetermined number of said time divisions define a frame, said system comprising:
means for splitting the received signal at ones of said plurality of antenna beams into a number of signals, wherein said number of signals is at least as great as the number of time divisions in said frame;
means associated with each said time division for adjusting the power level of ones of said split signals to result in a desired amplitude during a particular one of said time divisions;
means for providing interruptible signal paths between said signal splitting means and said power level adjusting means, said interruptible signal paths being operable to provide a split signal including a received signal associated with a particular time division to said power level adjusting means associated with the particular time division; and
means for recombining the power level adjusted signals.

20. The system of claim 19, wherein said interruptible signal path means comprises:
at least one switch matrix associated with each said time division, wherein said switch matrix includes an input path associated with each antenna beam and an output path associated with said power level adjustment means associated with the particular time division.

21. The system of claim 19, wherein said power level adjusting means and said interruptible signal path means are operated under the control of a control processor, said control of said adjusting means and said interruptible signal path means being substantially synchronous with said time divisions.

22. A method for providing each signal within a signal component of a plurality of signal components with independent power level adjustment, said method comprising the steps of:
splitting an input signal including said plurality of signal components to provide at least a split signal associated with each said signal component;
adjusting a power level of each said split signals to a predetermined magnitude, said magnitude being maintained throughout said associated signal component, said adjusting step resulting in a power level adjusted signal associated with each split signal wherein said signal within said signal component has said predetermined magnitude; and switching between each of said power level adjusted signals to produce an output including only said signal components having said predetermined magnitude.

23. The method of claim 22, wherein said signal components are selected from the group of signal components consisting of:

a time division associated with a time division multiple access scheme; and a signal frequency associated with a frequency division multiple access scheme.

24. The method of claim 22, wherein a predefined number of said signal components comprise a frame.

25. The method of claim 24, wherein said adjusting step comprises the step of adjusting an independently adjustable adjusting means associated with each signal component of said frame of signal components.

26. The method of claim 24, wherein said switching step comprises the step of:

switching an independently switchable switching device associated with each signal component of said frame of signal components.

27. The method of claim 26, wherein at least one of said independently switchable switching devices comprise a multiplexer.

28. The method of claim 22, wherein said switching means is operable to provide a particular signal component to circuitry associated with a select beam of a plurality of radiation beams.

29. The method of claim 28, further comprising the step of:

combining a plurality of input signal paths into at least one output signal path, wherein said input signal paths are associated with said output of said switching step and said at least one signal output path is associated with said particular radiation beam of said plurality of radiation beams.

30. The method of claim 22, wherein said steps are performed substantially concurrently on signal components associated with more than one input signal.

31. The method of claim 30, wherein said more than one input signal includes a first set and a second set of signal components, said first set including signal components associated with a first input signal, and said second set including signal components of a second input signal.

32. An apparatus for independently adjusting a power component of a forward link time division signal frame for each individual receiver communicating through said time division signal frame, wherein each said receiver communicating through said time division signal frame is assigned a particular burst thereof, said apparatus comprising:

a signal splitter having at least one input path and a plurality of output paths, a particular burst of said frame being associated with an output path of said plurality of output paths; and a plurality of attenuator/amplifiers having an input and an output, ones of said attenuator/amplifiers being coupled to ones of said output paths at said input, each of said attenuator/amplifiers operable to provide an output time division signal having a predetermined magnitude substantially throughout said particular burst associated with said output path.

33. The apparatus of claim 32, further comprising:

a switching device having a plurality of signal in paths and a plurality of signal out paths, said plurality of signal out paths including a plurality of signal out path sets, a particular burst of said frame being associated with a particular signal in path, each signal in path further being associated with a particular signal out path set of said plurality of signal out path sets, ones of said signal in paths being coupled to ones of said attenuator/amplifier outputs, said switching device being operable to direct a select burst of said frame to a particular signal out path.

34. The apparatus of claim 33, wherein said switching device comprises:

a plurality of switches including an independently switchable switch for each signal burst of said frame.

35. The apparatus of claim 33, wherein said switching device comprises a plurality of multiplexers each being associated with a different burst of said frame.

36. The apparatus of claim 33, wherein said switching device comprises a multiplexer having a number of signal in paths at least as great as a number of said bursts in said frame.

37. The apparatus of claim 33, wherein ones of said signal out paths of each signal out path set are associated with a different antenna component having a predefined radiation pattern, said antenna components disposed to provide substantially non-overlapping communication.

38. The apparatus of claim 37, wherein said ones of said signal out paths of each signal out path set associated with a particular antenna component are combined to provide a single input to said antenna component.

39. The apparatus of claim 33, further comprising:

a processor-based controller providing switching information associated with each burst of said frame to said switching device, said information being provided substantially synchronously with said frame of said time division signal propagating through said apparatus.

40. The apparatus of claim 32, further comprising:

a processor-based controller providing power component information associated with each burst of said frame to said plurality of attenuator/amplifiers, said information being provided substantially synchronously with said frame of said time division signal propagating through said apparatus.

41. The apparatus of claim 32, wherein said plurality of attenuator/amplifiers include an independently adjustable attenuator/amplifier for each burst of said frame.

42. An apparatus for independently adjusting a power component of each burst of a plurality of forward link time division signal frames, wherein a first frame of said plurality of frames is associated with a first radio frequency carrier frequency and a second frame of said plurality of frames is associated with a second radio frequency carrier frequency, said apparatus comprising:

a first signal splitter having at least one input path and a plurality of output paths, wherein a particular burst of said first frame is associated with an output path of said plurality of output paths;

a second signal splitter having at least one input path and a plurality of output paths, wherein a particular burst of said second frame is associated with an output path of said plurality of output paths; and a plurality of attenuator/amplifiers having an input and an output, said plurality of attenuator/amplifiers including a first set of attenuator/amplifiers and a second set of attenuator/amplifiers, wherein ones of said first set of attenuator/amplifiers are coupled to ones of said output paths of said first signal splitter at said input and ones of said second set of attenuator/amplifiers are coupled to ones of said output paths of said second signal splitter as said input, each of said attenuator/amplifiers operable to provide an output time division signal having a predetermined magnitude substantially throughout said particular burst associated with said output path.

43. The apparatus of claim 42, further comprising:

a first switching device set having a plurality of signal in paths and a plurality of signal out paths, said plurality of signal out paths including a first plurality of signal out path sets, a particular burst of said first frame being associated with a particular signal in path, each signal in path further being associated with a particular signal out path set of said first plurality of signal out path sets, ones of said signal in paths being coupled to ones of attenuator/amplifier outputs of said first set of attenuator/amplifiers, said first switching device being operable to direct a select burst of said first frame to a particular signal out path of said first switching device; and a second switching device set having a plurality of signal in paths and a plurality of signal out paths, said plurality of signal out paths including a second plurality of signal out path sets, a particular burst of said second frame being associated with a particular signal in path, each signal in path further being associated with a particular signal out path set of said second plurality of signal out path sets, ones of said signal in paths being coupled to ones of attenuator/amplifier outputs of said second set of attenuator/amplifiers, said second switching device being operable to direct a select burst of said second frame to a particular signal out path of said second switching device.

44. The apparatus of claim 43, wherein said first and second switching devices comprise:

a plurality of switches including an independently switchable switch for each signal burst of said first and second frame.

45. The apparatus of claim 43, wherein said first and second switching devices comprise a plurality of multiplexers each being associated with a different burst of said first and second frame.

46. The apparatus of claim 43, wherein ones of said signal out paths of each signal out path set are associated with a different antenna component having a predefined radiation pattern, said antenna components disposed to provide substantially non-overlapping communication.

47. The apparatus of claim 46, wherein said ones of said signal out paths of each signal out path set associated with a particular antenna component are combined to provide a single input to said antenna component.

48. The apparatus of claim 43, further comprising:

a processor-based controller providing switching information associated with each burst of said first frame to said first switching device, said information being provided substantially synchronously with said first frame of said time division signal propagating through said apparatus.

49. The apparatus of claim 42, further comprising:

a processor-based controller providing power component information associated with each burst of said first frame to said first set of attenuator/amplifiers, said information being provided substantially synchronously with said first frame of said time division signal propagating through said apparatus.

50. The apparatus of claim 42, wherein said plurality of attenuator/amplifiers include an independently adjustable attenuator/amplifier for each burst of said first and second frame.

51. A system for providing each time division of a frame including a plurality of said time divisions with autonomous power level adjustment, said system comprising:

means for adjusting said power level, said adjusting means including independently adjustable adjusting means for each time division of said frame, each adjusting means being operable to adjust said power level of an input signal to a predetermined magnitude maintained during a respective time division, each adjusting means outputting a power level adjusted signal having said predetermined magnitude at said respective time division;

means for selectively switching between each of said power level adjusted signals, said switching means including an independently switchable switching device for each time division of said frame, said switching means providing a plurality of discrete signal components, each discrete signal component comprising a different one of said respective time divisions;

controller means for controlling adjustment of said adjusting means and switching of said switching means; and antenna means for transmitting said discrete signal components.

52. The system of claim 51, wherein ones of said plurality of switching devices comprise a multiplexer.

53. The system of claim 51, wherein said antenna means comprise an antenna array adapted to provide a plurality of radiation beams, said antenna array including circuitry adapted to provide directional communication through ones of said plurality of radiation beams.

54. The system of claim 53, wherein said controller means operates to switch said switching means to provide a particular discrete signal component to a portion of said circuitry associated with a predetermined beam of said plurality of radiation beams.

55. The system of claim 54, wherein said circuitry comprises means for combining a plurality of input signal paths into at least one output signal path, wherein said combining means includes at least one signal combiner means associated with a particular radiation beam of said plurality of radiation beams.

56. The system of claim 53, wherein said antenna array comprises an antenna unit for each radiation beam of said plurality of radiation beams.

\* \* \* \* \*